United States Patent [19]
Matsuse et al.

[11] Patent Number: 5,663,765
[45] Date of Patent: Sep. 2, 1997

[54] APPARATUS AND METHOD FOR PROCESSING IMAGE SIGNALS

[75] Inventors: Shusaku Matsuse, Ohtsu; Katsuhiko Ohsaki, Shiga-ken, both of Japan

[73] Assignee: International Business Machines Corporation, Armonk, N.Y.

[21] Appl. No.: 543,185

[22] Filed: Oct. 13, 1995

[30] Foreign Application Priority Data

Oct. 13, 1994 [JP] Japan ................................. 6-247796

[51] Int. Cl.$^6$ .............................. H04N 7/01; H04N 11/20
[52] U.S. Cl. .................................. 348/448; 348/792
[58] Field of Search ............................ 348/790–793, 348/441, 443, 448, 458, 800; 346/131, 190; H04N 4/01, 11/20, 3/14

[56] References Cited

U.S. PATENT DOCUMENTS

| | | |
|---|---|---|
| 5,003,388 | 3/1991 | Shirochi et al. ............ 348/458 |
| 5,488,389 | 1/1996 | Nakanishi et al. ........... 348/443 |

Primary Examiner—Michael H. Lee
Attorney, Agent, or Firm—Ronald L. Drumheller

[57] ABSTRACT

Interlaced image signals are converted into non-interlaced image signals and the scanning lines are also thinned out (i.e., the number of lines is reduced). Line memories L1–L5 are provided in a number (5) corresponding to the number of horizontal scanning lines thinned out by a predetermined number of lines every number of lines determined from the total number of horizontal scanning lines of the PAL signal and that of the NTSC signal. A demultiplexer 12 selects the memories L1–L5 so that each PAL signal corresponding each of first to fifth ones of six horizontal scanning lines is stored. A selector 14 sequentially read the memories L1–L5 twice during an interval from the time when the PAL signal corresponding to the first horizontal scanning line is stored to the time from storing the PAL signal corresponding to the first horizontal scanning line but before storing the PAL signal corresponding to the seventh horizontal scanning line.

3 Claims, 4 Drawing Sheets

APPARATUS AND METHOD FOR PROCESSING IMAGE SIGNALS

BACKGROUND OF THE INVENTION

1. Field of the Invention

The present invention relates to a signal processing device, and, more particularly, to a signal processing device for processing image signals in which total number of horizontal scanning lines forming one screen is predetermined.

2. Related Art

Conventionally, image signals for television or the like (interlace type signals) include those of the NTSC (National Television System Committee) system, the PAL (Phase Alternation by Line) system, and the SECOM (Sequential Colours A Memoirs) system. Among them, for example, image signals for one screen (one frame) in the NTSC system are composed of 525 horizontal scanning lines. When the image signals for one screen in the NTSC system are displayed on the television receiver or the like, it is arranged to divide the image signals into an odd-numbered field (hereinafter called the "Odd field") consisting of 262.5 odd-numbered horizontal scanning lines, and an even-numbered field (hereinafter called the "EVEN field") consisting of 262.5 even-numbered horizontal scanning lines, to alternately display the Odd field and the EVEN field, and to insert the scanning lines of the EVEN field between the scanning lines of the Odd field so that one screen is formed by both fields.

On the other hand, a liquid crystal display device generally used is a one having a display screen which has 480 horizontal scanning lines with 640 dots per line (VGA mode), a TFT (Thin Film Transistors) being disposed as a switching element on each picture element (active matrix driving system). Because such liquid crystal display is designed to be scanned in the non-interlace mode, when it is intended to display the above-mentioned image signals on the liquid crystal display, the image signals which is interlace signals should be converted into non-interlace signals.

Accordingly, when image signals, for example, image signals of the NTSC system are intended to be displayed on the above-mentioned liquid crystal display, because the Odd and EVEN fields of the image signals have 241.5 lines of valid data, respectively, total 1.5 lines at the top and bottom of them are made a non-display area by overscanning, and the image signals in the Odd and EVEN fields for remaining 240 lines are converted into 480 lines of non-interlace signals, respectively.

On the other hand, image signals in the PAL or SECOM system have total scanning lines of 625 lines in one frame, which are 100 lines more than those in the image signals in the NTSC system so that, when the image signals in the PAL or SECOM system are displayed on the liquid crystal display attaining display in the VGA mode for the NTSC system, it is necessary to thin out the scanning lines.

When the image signals in the PAL or SECOM system are displayed on the liquid crystal display attaining display in the VGA mode for the NTSC system, first, to convert the image signals which are interlace type signals into non-interface type signals, the image signals in the Odd and EVEN fields are written in a frame memory to form one frame. Then, when the image signals are read from the frame memory, the scanning lines are thinned out.

However, a memory space of about 1M-bytes becomes necessary to write the image signals in the Odd and EVEN fields in the frame memory so that the device becomes complicated.

Alternatively, two line memories in each of which is image signals for one line are written are used to write image signals for one line in one of them instead of the frame memory. They are read at a speed twice that of writing, while image signals for another one line are written in the other line memory. Thus, display of two lines is performed with the image signals for one line. In this way, when the image signals of the PAL or SECOM system is displayed on the liquid crystal display for the NTSC system, write or read of signals for one line should be stopped for thinning. Therefore, the image signals cannot be properly displayed.

The present invention is invented in view of the above facts, and intended to provide a signal processing device which converts interlace image signals into those for the non-interlace mode with a simple arrangement, and which can thin out image signals with a simple arrangement.

SUMMARY OF THE INVENTION

To attain the above object, a first aspect of the present invention is an image signal processing apparatus processing input image signals, and scanning horizontal scanning lines for display means, which form one screen, with the number of horizontal scanning lines corresponding to the least total number of horizontal scanning lines of a plurality of image signals in different systems for forming one screen in the interlace mode, the image signal processing apparatus comprising a plurality of storage means each of which stores respective signals for one horizontal scanning line of the input image signals, control means for performing control in such a manner that the horizontal scanning lines are thinned out by number of lines predetermined from the total number of horizontal scanning lines of the input image signals and those of the display means so that signals for each horizontal scanning line of the image signals are stored in each of the plurality of storage means, and scanning means for sequentially reading the signals for one scanning line from each of the plurality of storage means and for horizontally scanning every two horizontal scanning lines of the display means with the respective read out signals.

A second aspect of the present invention is an image signal processing apparatus processing input image signals, and scanning horizontal scanning lines for display means, which form one screen, with the number of horizontal scanning lines corresponding to the least total number of horizontal scanning lines of a plurality of image signals in different systems for forming one screen in the interlace mode, the image signal processing apparatus comprising a plurality of storage means providing in correspondence to the number of horizontal scanning lines which is the number of lines thinned out by subtracting predetermined number of lines from the number of lines predetermined from the total number of horizontal scanning lines of second image signals, which is larger in number than those of first image signals with the least total number of horizontal scanning lines for forming one screen in the interlace mode, and the total number of horizontal scanning lines of the display means, each of which stores signals for one horizontal scanning line of the input second image signals, selection means for selecting the plurality of storage means in such a manner that each of the second image signals are stored, corresponding to each of a plurality of horizontal scanning lines other than the last horizontal scanning line in a plurality of horizontal scanning line groups which is aggregate of the horizontal scanning lines in the predetermined number of lines, and scanning means for reading twice respective signals from each of said storage means in said sequence of selection during a time interval from a point of time after the time when the second image signals corresponding to the top horizontal scanning line in each of said plurality of horizontal scanning line groups are stored, but before the time when the second image signals corresponding to the top horizontal scanning line in the next horizontal scanning line group which is a horizontal scanning line group following the horizontal scanning line group is stored, to the time from the time when the second image signals corresponding to the top horizontal scanning line of said horizontal scanning groups is stored to the time when the second image signals corresponding to the top horizontal scanning line of said next horizontal scanning line group is stored, and for scanning every two horizontal scanning lines of said display means with respective signals read twice from each of said storage means.

A third aspect of the present invention is an image signal processing method processing input image signals, and scanning horizontal scanning lines for display means, which form one screen, with the number of horizontal scanning lines corresponding to the least total number of horizontal scanning lines of a plurality of image signals in different systems for forming one screen in the interlace mode, the signal processing method comprising steps of thinning out horizontal scanning lines by number of lines predetermined from the total number of horizontal scanning lines of the input image signals and those of the display means, and scanning every two horizontal scanning lines of the display means with the respective image signals.

The image signal processing apparatus according to the first aspect of the present invention processes input image signals, and scans the horizontal scanning lines of the display means which forms one screen with the number of horizontal scanning lines corresponding to the least total number of horizontal scanning lines of a plurality of image signals in different systems forming one screen in the interlace mode.

Here, the plurality of image signals in different systems includes, for example, the NTSC system, the PAL system, and the SECOM system. Among them, the image signals with the least total number of horizontal scanning lines is those of the NTSC system.

As above, the display means forms one screen with the number of horizontal scanning lines corresponding to the total number of horizontal scanning lines of image signals with the least total number of horizonal scanning lines (at present, image signals of the NTSC system).

When such display means is scanned with image signals other than the image signals with the least total number of horizontal scanning lines, it is necessary to thin out the input image signals. In addition, when the display means forms one screen in the non-interlace mode, it is necessary to convert the input image signals to those for the non-interlace mode.

Then, the present invention provides a plurality of storage means each of which stores signals for one horizontal scanning line of the input image signals.

The control means performs control in such a manner that the horizontal scanning lines are thinned out by number of lines predetermined from the total number of horizontal scanning lines of the input image signals and those of the display means so that signals for each horizontal scanning line of the image signals are stored in each of the plurality of storage means.

Then, the scanning means sequentially reads signals for one horizontal scanning line from each of the plurality of storage means, and sequentially and horizontally scans every two horizontal scanning lines of the display means with respective read out signals.

As described, because it is arranged to store in each of a plurality of storage means respective signals for one horizontal scanning line of the input image signals by thinning out the horizontal scanning lines with the number of lines predetermined from the total number of lines of the input image signals and those of the display means, thinning can be performed for the input image signals. In addition, because the signals for one horizontal scanning line are sequentially read out from each of the plurality of storage means, and every two horizontal scanning lines of the display means are horizontally scanned by respective read out signals, it is possible to convert the image signals in a system for forming one screen in the interlace mode to those meeting the non-interlace mode. That is, it is possible to convert the interlace signals into those in the non-interface mode with a simple arrangement, and to thin out the image signals with a simple arrangement through input of signals to a plurality of storage means, and reading of signals from the plurality of storage means.

The above-mentioned thinning of image signals performed by thinning out the number of horizontal scanning lines by the number of lines predetermined from the total number of horizontal scanning lines of the input image signals and those of the display means, and storing respective signals for one horizontal scanning line of the image signals in each of the plurality of storage means, and the conversion of the image signals into those in non-interlace mode by reading signals for one horizontal scanning line from each of the plurality of storage means, and scanning every two horizontal scanning lines of the display means with the respective read out signals are performed, for example, as follows according to the second aspect of the present invention.

That is, the image signal processing apparatus according to the second aspect of the present invention processes the input image signals, and scans the horizontal scanning lines of the display means which form one screen with the number of horizontal scanning lines corresponding to the least total number of horizontal scanning lines of a plurality of image signals in different systems for forming one screen in the interlace mode.

Each of a plurality of storage means providing in correspondence to the number of horizontal scanning lines which is the number of lines thinned out by subtracting predetermined number of lines from the number of lines predetermined from the total number of horizontal scanning lines of second image signals, which is larger in number than those of first image signals with the least total number of horizontal scanning lines for forming one screen in the interlace mode, and the total number of horizontal scanning lines of the display means stores signals for one horizontal scanning line of a second input image signals.

The selection means selects the plurality of storage means in such a manner that each of the second image signals are stored, corresponding to each of a plurality of horizontal scanning lines other than the last horizontal scanning line in a plurality of horizontal scanning line groups which is aggregate of the horizontal scanning lines in the predetermined number of lines from the total number of horizontal scanning lines and those of the display means of second image signals.

Then, the scanning means reads twice respective signals from each of said storage means in the sequence of selection during a time interval from a point of time after the time when the second image signals corresponding to the top horizontal scanning line in each of the plurality of horizontal scanning line groups are stored, but before the time when the second image signals corresponding to the top horizontal scanning line in the next horizontal scanning line group which is a horizontal scanning line group following the horizontal scanning line group is stored, to the time from the time when the second image signals corresponding to the top horizontal scanning line of the horizontal scanning groups is stored to the time when the second image signals corresponding to the top horizontal scanning line of the next horizontal scanning line group is stored, and for scanning every two horizontal scanning lines of said display means with respective signals read twice from each of said storage means.

The operation of the third aspect of the present invention is same as that of the first aspect of the present invention so that it is omitted.

DESCRIPTION OF A PREFERRED EMBODIMENT

Now, an embodiment of the present invention will be explained in detail by referring to the drawings. The embodiment is the present invention applied to an image signal processing device which displays image signals in the PAL system on a liquid crystal display panel for displaying image signals in the NTSC system which have the least total number of horizontal scanning lines for forming one screen in image signals in the NTSC, PAL and SECOM systems.

Figure 1:
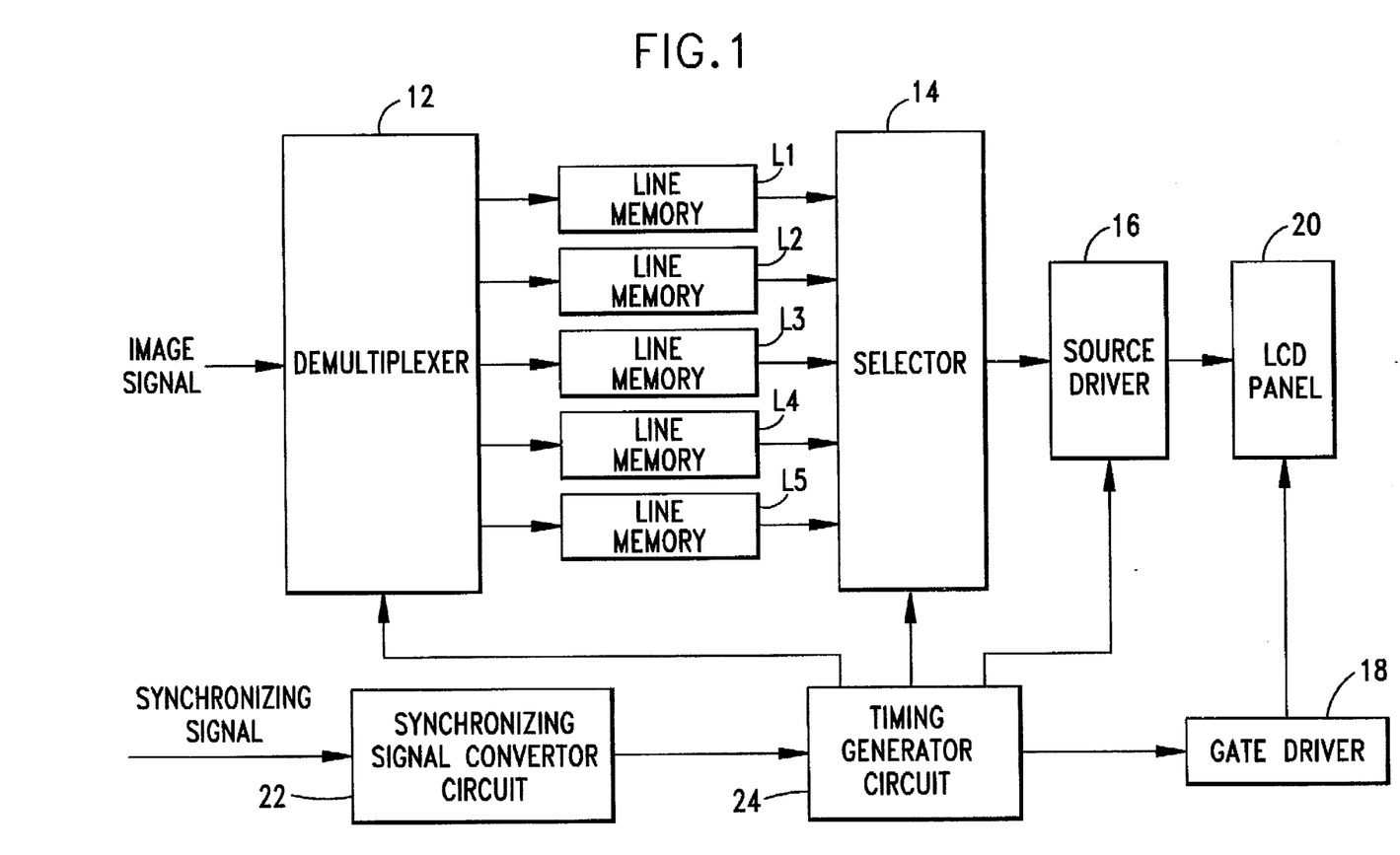
FIG. 1 is a block diagram of an embodiment.

The embodiment has, as shown in FIG. 1, a liquid crystal display (LCD) panel 20. The liquid crystal display panel 20 has a display screen which has 480 horizontal scanning lines with 640 dots per line (VGA mode) corresponding to the image signals in the NTSC system, with TFTs (Thin Film Transistors) being disposed on each picture element as a switching element (active matrix driving system). In addition, the liquid crystal display panel 20 is constructed in a three-layered dot matrix structure. The liquid crystal display panel 20 is connected with a source driver 16 for driving a source line and a gate driver 18 for driving a gate line of the liquid crystal display panel 20.

The embodiment is provided with a demultiplexer 12 for inputting image signals in the PAL system. The demultiplexer 12 is connected with five line memories L1–L5 which are, in turn, connected to a selector 14. The selector 14 is connected to the source driver 16.

The source driver 16, the gate driver 18, the demultiplexer 12, and the selector 14 are connected to a timing generator circuit 24. The timing generator circuit 24 is driven by a converted synchronizing signal which is a synchronizing signal converted by a synchronizing signal convertor circuit 22. That is, the selector 14 sequentially supplies image signals in the PAL system corresponding to one horizontal scanning line to the source driver 16. The source driver 16 scans the horizontal scanning line of the liquid crystal display panel 20 with the image signals corresponding to the horizontal scanning line based on a horizontal scanning timing signal from the timing generator circuit 24. Simultaneously, the gate driver 18 performs vertical scanning based on a vertical scanning timing signal from the timing generator circuit Here, the reason why five line memories L1–L5 are provided is described.

As described above, because the liquid crystal display panel 20 has a display screen having 480 horizontal scanning lines with 640 dots per line for the image signals in the NTSC system, when it is scanned by image signals in the PAL system, it is necessary to thin out the input image signals in the PAL system.

Since the image signals in the PAL system has the total number of horizontal scanning lines of 625, while those in the NTSC system has 525 lines, the difference between both total numbers of horizontal scanning lines is 100. Due to this difference of 100 lines, how much horizontal scanning lines of the image signals in the PAL system should be thinned out in what interval is determined from the following formula (1) to scan the display screen of the liquid crystal display panel 20 with the image signals of the PAL system:

$$625/100(625-525)=6.25 \div \approx 6$$

Thus, when one horizontal scanning line is thinned out by every six lines of the image signals in the PAL system, the total number of horizontal scanning lines to be thinned out is $625/6 \div \approx 104$ lines.

This thins out the total number of horizontal scanning lines in the PAL system (625 lines) by 104 lines to make it 521 lines, which substantially equals to the total number of horizontal scanning lines in the NTSC system (525 lines). Accordingly, because the horizontal scanning lines are thinned out by every six lines, five line memories are provided.

Next, the operation of the embodiment will be explained with reference to FIGS. 2 to 4.

As the liquid crystal display panel 20 is scanned by signals in the non-interlace mode, when the image signals in the PAL system (signals in the interlace mode) are displayed, it is necessary to convert the image signals into signals in the non-interlace mode. In addition, because the embodiment is to display the image signals in the PAL system on the liquid crystal display panel 20 displaying the image signals in the NTSC system, it is also necessary to thin out the image signals in the PAL system.

The liquid crystal display panel 20 is assumed to be one for the NTSC system because there are the NTSC, PAL, and SECOM systems for the image signals, and the image signals in the NTSC system has the least total number of horizontal scanning lines so that, if the liquid crystal display panel 20 is for the PAL system, the screen is reduced by the smaller number of lines when the image signals in the NTSC system is displayed.

The embodiment performs the conversion of image signals in the PAL system into those in the non-interlace mode by continuously scanning the image signals in the PAL system corresponding to one horizontal scanning line on two horizontal scanning lines of the liquid crystal display panel 20.

The reason why the image signals in the PAL system corresponding to one horizontal scanning line are continuously scanned on two horizontal scanning lines of the liquid crystal display panel 20 lies in the fact that, because the image signals in the PAL system are interlace ones, that is, image signals forming one screen with those of Odd and EVEN fields, if every one of the horizontal scanning lines of the liquid crystal display panel 20 is horizontally scanned with the image signals for one horizontal line in the PAL system, the scanning area covers only one-half of the liquid crystal display panel 20. In addition, because one screen of the liquid crystal display panel 20 is formed by respective image signals of the Odd and EVEN fields, if three or more horizontal scanning lines of the liquid crystal display panel 20 are horizontally scanned with the image signals for one horizontal scanning line in the PAL system, one screen of the liquid crystal display panel 20 is completed for scanning in the middle of the image signals of the Odd field and in the middle of those of the EVEN field.

Furthermore, in the embodiment, the above-mentioned thinning of the image signals in the PAL system is performed by thinning out one horizontal scanning line in every six horizontal scanning lines.

In the following, more detailed description is given by referring to the timing charts shown in FIGS. 2 to 4.

Figures 2A, 2B:
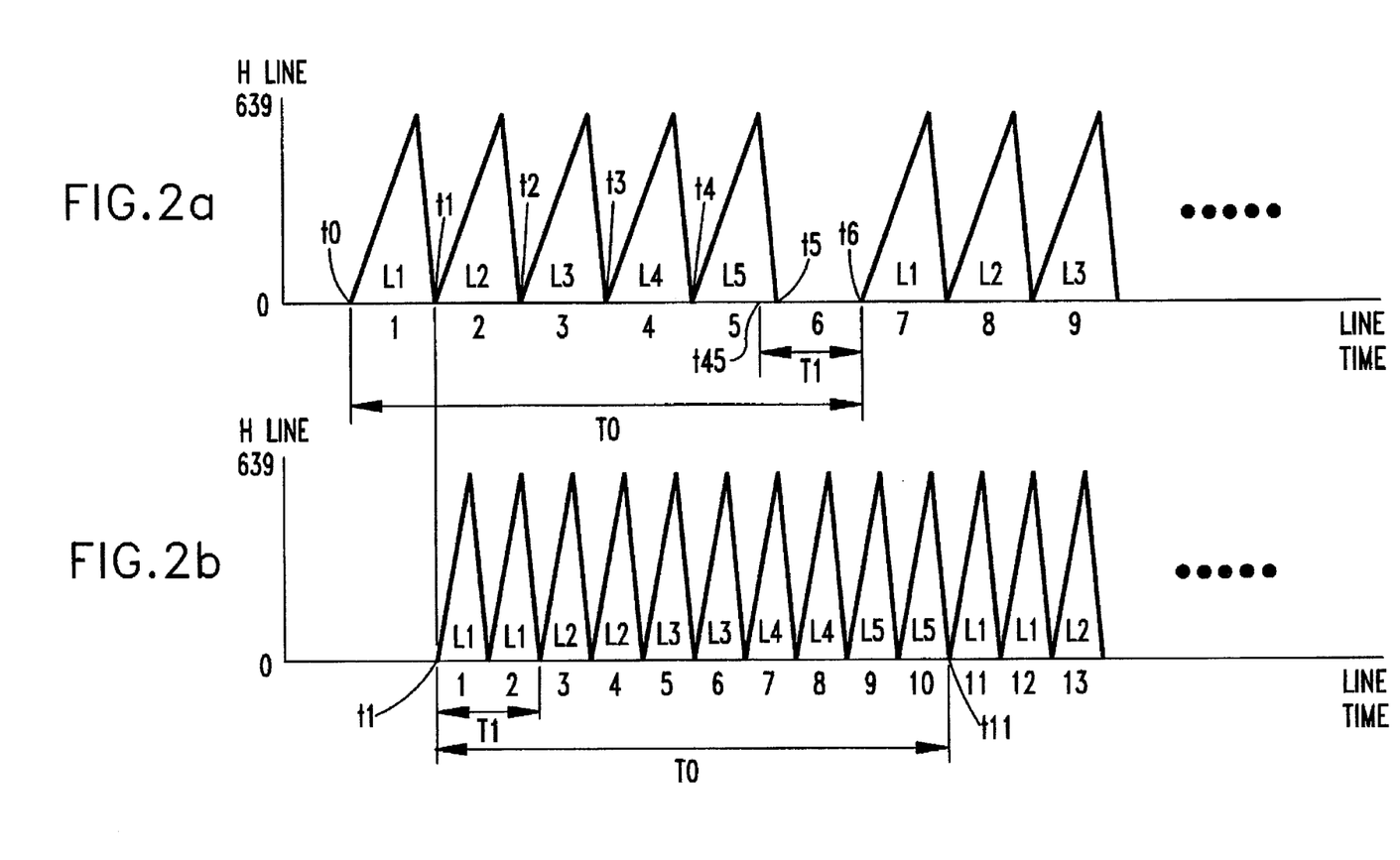
FIG. 2(a) is a timing chart for writing of an Odd field of the embodiment.
FIG. 2(b) is a timing chart for reading of an Odd field of the embodiment.
Figure 3A:
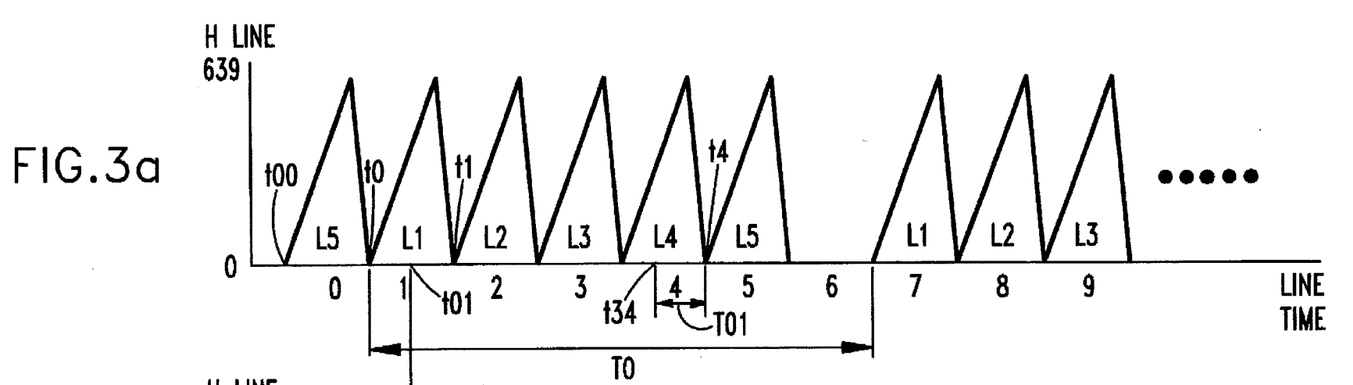
FIG. 3(a) is a timing chart for writing of an EVEN field of the embodiment (at starting time)
Figure 3B:
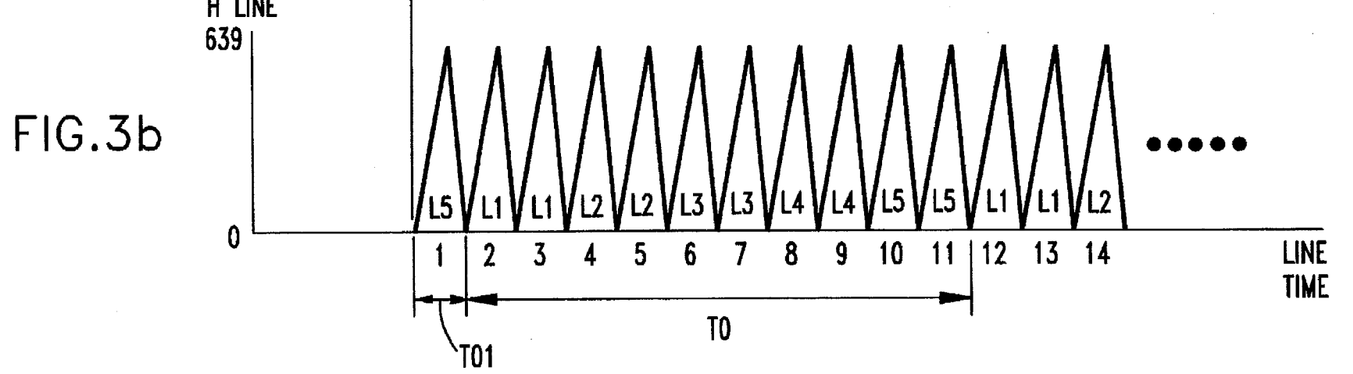
FIG. 3(b) is a timing chart for reading of the EVEN field of the embodiment (at starting time)
Figure 4A:
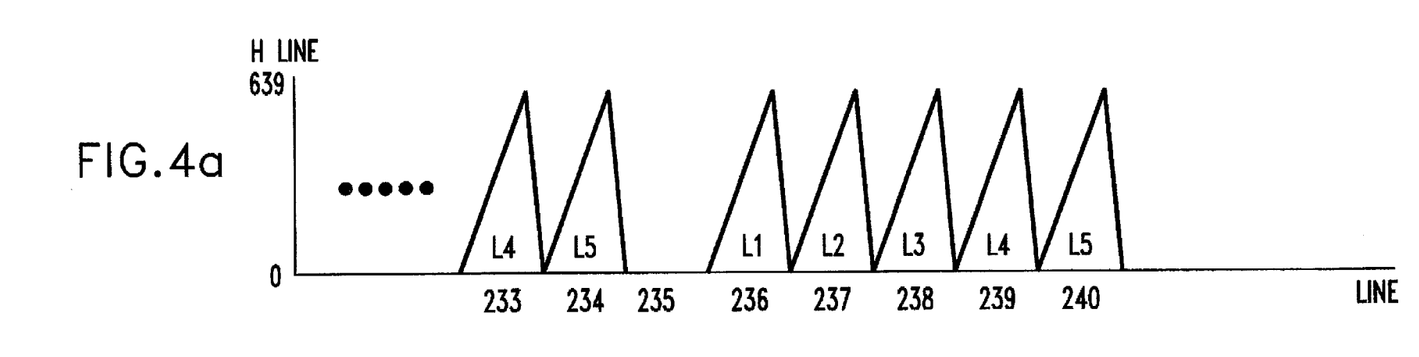
FIG. 4(a) is a timing chart for writing of an EVEN field of the embodiment (at ending time)
Figure 4B:
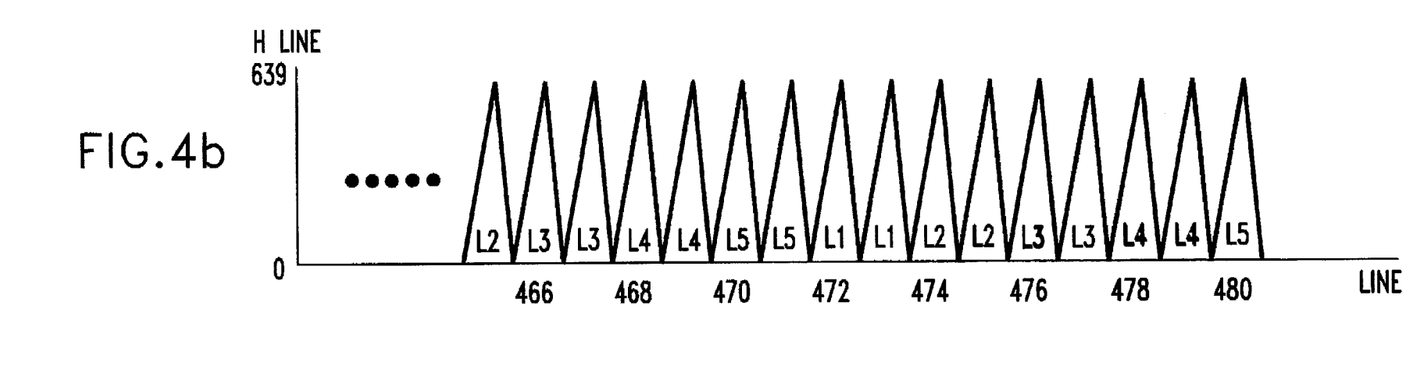
FIG. 4(b) is a timing chart for reading of the EVEN field of the embodiment (at ending time).

The axis of ordinate of the timing charts shown in FIGS. 2 to 4 represents the dot position of horizontal scanning line, while the axis of abscissa represents the number and time of horizontal scanning lines. Moreover, FIGS. 2(a), 3(a), and 4(a) represent timing for writing PAL signals to the line memories L1–L5, the number on the axis of abscissa representing the number of PAL signal. FIGS. 2(b), 3(b), and 4(b) represent the number of horizontal scanning line on the liquid crystal display panel 20. Triangles in FIGS. 2 to 4 represent scanning of one horizontal scanning line, the right side of the triangle representing a fly-back line of one horizontal scanning line. The sign for a line memory to be written with the PAL signal is shown in the triangles of FIGS. 2(a), 3(a), and 4(a), while the sign for a line memory to which the written PAL signal is read is shown the triangles of FIGS. 2(b), 3(b), and 4(a). FIG. 2 represents the processing of image signals in the Odd field, while FIGS. 3 and 4 represent the processing of image signals in the EVEN field.

Next, description is given on writing of image signals in the PAL system (hereinafter called the "PAL signal") in the Odd field (see FIG. 2(a)).

First, a demultiplexer 12 selects each of the line memories L1–L5 based on the timing signal of the timing generator circuit 24 so that each of PAL signal corresponding to first to fifth horizontal scanning line, respectively, is directly written. When the line memory L5 is selected and the PAL signal corresponding to the fifth horizontal scanning line is written in the line memory L5, the demultiplexer 12 prevents the PAL signal corresponding to the next horizontal scanning line from being written. This thins out the PAL signals for one line in every six horizontal scanning lines. Then, the demultiplexer 12 writes the PAL signals for the seventh or after horizontal scanning line and thereafter in the same manner as above, and selects the line memories L1–L5 in which all PAL signals corresponding to 288 horizontal scanning lines are continuously stored.

Next, reading of the PAL signals in the Odd field is described (see FIGS. 2(a) and 2(b)).

The reading is started at any point of time from time t6 storing the image signals corresponding to the seventh horizontal scanning after time t1 when the PAL signal corresponding to the first horizontal scanning line is stored to time t45 earlier by time T1 for reading the PAL signal from the line memory L1, that is, time t1 in the embodiment. The reason why time after the time t1 is selected lies in the fact that, if reading the PAL signal at timing before the time t1 starts reading in a state where the PAL signal is not yet written in the line memories L1–L5 so that the PAL signal cannot be read. On the other hand, the reason why the interval from the time t6 to the time t45 earlier by the read time T1 is selected lies in the fact that, if the PAL signal is read at timing after the time t45 earlier than the time t6 by the time T1, the seventh PAL signal or later is written before reading of the first to the fifth PAL signals so that the first PAL signal or later cannot be read.

That is, the selector 14 selects the line memories L1–L5 so that the PAL signals are sequentially read out twice from each of the line memories L1–L5 from the time t1, to time T0 from time t0 when the PAL signal corresponding to the first horizontal scanning line is written in the line memory L1 to the time t6 when the PAL signal corresponding to the seventh horizontal scanning line is written in the line memory L1, that is, from the time t1 to time t11. Therefore, the selector 14 is adjusted for the read timing so that it can continuously read the PAL signals ten times during time T0. That is, the selector 14 is input with the synchronizing signal ten times during the time T0 from the timing generator circuit 24, and, every time when the synchronizing signal is input, the selector 14 reads the PAL signals from the line memories L1–L5. The selector 14 switches the selection of line memories L1–L5 from which the PAL signal is read when the synchronizing signal from the timing generator circuit 24 is input twice.

Then, two horizontal scanning lines of the liquid crystal display panel 20 are scanned with respective PAL signals corresponding to one horizontal scanning line written in each of the line memories L1–L5 by reading every PAL signals written in the line memories L1–L5 twice. This enables it to convert the PAL signals which are interlace signals into non-interlace signals.

As described, since the read time of PAL signal from the line memory in which the PAL signal is stored is caused to correspond to the time (T0) which is time adding the thinning time for the PAL signal corresponding to one horizontal scanning line to the write time of PAL signals corresponding to five horizontal scanning lines, it is possible to synchronize the timing for Odd field with the display timing of the liquid crystal display panel 20.

Next, description is given on writing of image signals in the PAL system (hereinafter called the "PAL signal") in the EVEN field (see FIGS. 3(a) and 4(a)).

As described, because the PAL signal is interlaced, the write timing is shifted by one-half cycle in the EVEN field. Therefore, if the writing in the EVEN field is performed in the same manner as the writing of PAL signal in the Odd field, the PAL signal corresponding to the first horizontal scanning line in the EVEN field is lost. Then, in the embodiment, the writing of PAL signal in the EVEN field is started at time t00 earlier than the time t0 when the PAL signal corresponding to a full horizontal scanning line following one-half horizontal scanning line is written by the time when the PAL signal corresponding to one horizontal scanning line is written. That is, the demultiplexer 12 selects the line memory L5 at the time t00 so that the PAL signal corresponding to one-half horizontal scanning line is written in the line memory L5. Thereafter, the process is same as the above-described writing of PAL signal in the Odd field.

Next, description is given on reading of PAL signal from the EVEN field (see FIGS. 3(a), 3(b), and 4(b)).

As described, the PAL signal corresponding to one-half horizontal scanning line is written in the line memory L5, and, then, the PAL signal corresponding to each of the first to fifth horizontal scanning lines is written in the line memories L1-L5, respectively. Therefore, to read the PAL signal corresponding to one-half horizontal scanning line from the line memory L5, it is required that the PAL signal corresponding to one-half horizontal scanning line is read from the line memory L5 before the time t4 when the PAL signal corresponding to the fifth horizontal scanning line is written in the line memory L5.

Therefore, the reading of PAL signal from the EVEN field is arranged to be started at any point of time after the time t0 when the PAL signal corresponding to one-half horizontal scanning line was written in the line memory L5, but before time t34 earlier than the time t4 by the time T0 necessary for reading the PAL signal corresponding to one-half horizontal scanning line from the line memory L5, which, in the embodiment, is time t01 from the time t0 when the writing of PAL signal corresponding to the first horizontal scanning line in the line memory L1 is started to the time t1 when such writing completes.

The time T01 necessary to read the PAL signal corresponding to one-half horizontal scanning line from the line memory L5 from the time t4 is one-half the time necessary to read the PAL signal corresponding to one horizontal scanning line. This is because the PAL signal corresponds to one-half horizontal scanning line, and it is sufficient to scan only one horizontal scanning line of the liquid crystal display panel 20.

After the PAL signal corresponding to one-half horizontal scanning line is read from the line memory L5, the process is substantially same as the above-mentioned reading of PAL signal from the Odd field. This causes to scan one horizontal scanning line of the liquid crystal display panel 20 with the PAL signal corresponding to one-half horizontal scanning line, and, then, to scan two horizontal scanning lines of the liquid crystal display panel 20 with the PAL signal corresponding to one horizontal scanning line. That is, the PAL signal which is an interlace signal is converted into a non-interlace signal.

Here, as described above, only the first horizontal scanning line of the liquid crystal display panel 20 is scanned with the PAL signal corresponding to one-half horizontal scanning line written in the line memory L5 so that it is shifted by one horizontal scanning line when compared with the Odd field. Therefore, as shown in FIG. 4(b), the process completes by scanning the last horizontal scanning line of the liquid crystal display panel 20 with the PAL signal corresponding to the last horizontal scanning line of the EVEN field.

According to the embodiment described above, the demultiplexer sequentially selects each of five line memories to write the PAL signal, the selector sequentially selects each of five line memories to read the stored PAL signal, and the timing of the Odd and EVEN field and the display timing of the liquid crystal display panel 20 are synchronized by causing the time for reading the PAL signal from the line memory in which the PAL signal is stored to correspond to the time thinning out the PAL signal corresponding to one horizontal scanning line added with the time for writing the PAL signals corresponding to five horizontal scanning lines so that it is possible to thin out the PAL signal and to convert the non-interlace signals. Thus, it is possible to convert the PAL signal which is an interlace signal into a non-interlace signal with the image processing device with simple arrangement, and to thin out the PAL signal with the image processing device with simple arrangement.

In addition, according to the above-mentioned embodiment, because writing and reading of the PAL signal are not simultaneously performed for one line memory, it is possible to use normal SRAM as the line memory. Thus, the image processing device can be constructed to have a simple arrangement.

While the embodiment described above uses five line memories, it is not limited to such arrangement, but may have other number of line memories. The number of lines for the PAL signal to be thinned out depends on the number of line memories. That is, while the above-mentioned embodiment thins out the PAL signal corresponding to one horizontal line for every six horizontal scanning lines by using five line memories, when other number of line memories, for example, six line memories are used, the PAL signal corresponding to one horizontal scanning line would be thinned out for every seven horizontal scanning lines.

In addition, while the above-mentioned embodiment is described for a case where the horizontal scanning lines of the liquid crystal display panel for the NTSC system are scanned with the PAL signal, the present invention is not limited to such arrangement, but may be applied to a case where the horizontal scanning lines of the liquid crystal display panel for the NTSC system are scanned with image signals in the SECOM system.

Furthermore, while the above-mentioned embodiment is described for the liquid crystal display panel for image signals in the NTSC system is used, the present invention is not limited to such arrangement. For example, the present invention may be applied to a case where a liquid crystal display panel for PAL signal is scanned with image signals in the SECOM system or new image signals with the number horizontal scanning lines different from the total number of horizontal scanning lines of existing image signals by using a liquid crystal display panel meeting the PAL signal or such new image signals.

Furthermore, while the above-mentioned embodiment is described for image signals in the NTSC system which has the least total number of horizontal scanning lines for constituting one screen, the present invention may be applied to image signals in a new system in which the total number of horizontal scanning lines is less than that of image signals in the NTSC system. In such case, it is sufficient that the total number of horizontal scanning lines of the liquid crystal display panel is defined in accordance with the image signals in the new system, and that the number of lines to be thinned out from the image signals in the NTSC, PAL or SECOM system is determined from the relationship between the total number of horizontal scanning lines of the liquid crystal display panel and that of image signals in the NTSC, PAL or SECOM system to scan the horizontal scanning lines of the liquid crystal display panel.

As described above, the present invention can perform thinning of image signals and conversion into non-interlace signals by inputting signals into a plurality of storage means and reading the signals from the plurality of storage means so that it can provide advantages that interlace image signals can be converted to meet the non-interlace mode with a simple arrangement and the thinning of image signals can be performed with a simple arrangement.

We claim:

1. An image signal processing apparatus for converting an interlaced image signal having a first number of image lines into a non-interlaced image signal having a second number of image lines, the interlaced image signal representing two successive interlaced fields for each image frame, each said field having one half of the first number of image lines, the second number of image lines being smaller than the first number of image lines, the difference between the first and second number of image lines being a third number of image lines that are removed uniformly from the interlaced image signal in order to form the non-interlaced image signal by dividing the interlaced image signal into successive sets of consecutive image lines, removing one image line from each said set of image lines, and retaining a predetermined fourth number of image lines in each said set of image lines, comprising:

a multiplicity of line storage memories equal in number to said predetermined fourth number;

means for temporarily storing the retained predetermined fourth number of image lines from successive ones of said sets in the multiplicity of line storage memories; and means for reading said line storage memories each twice and in succession for each said set of image lines, thereby generating a non-interlaced image signal representing two successive image frames each having the second number of image lines from each frame of the interlaced image signal having the first number of image lines.

2. An image signal processing apparatus as in claim 1 wherein the predetermined fourth number is five and each said set of image lines contains six image lines of which five image lines are retained and one image line is removed.

3. An image signal processing apparatus as in claim 2 wherein the interlaced image signal is a PAL image signal and the non-interlaced image signal is a liquid crystal display image signal.

* * * * *